UNITED STATES PATENT OFFICE.

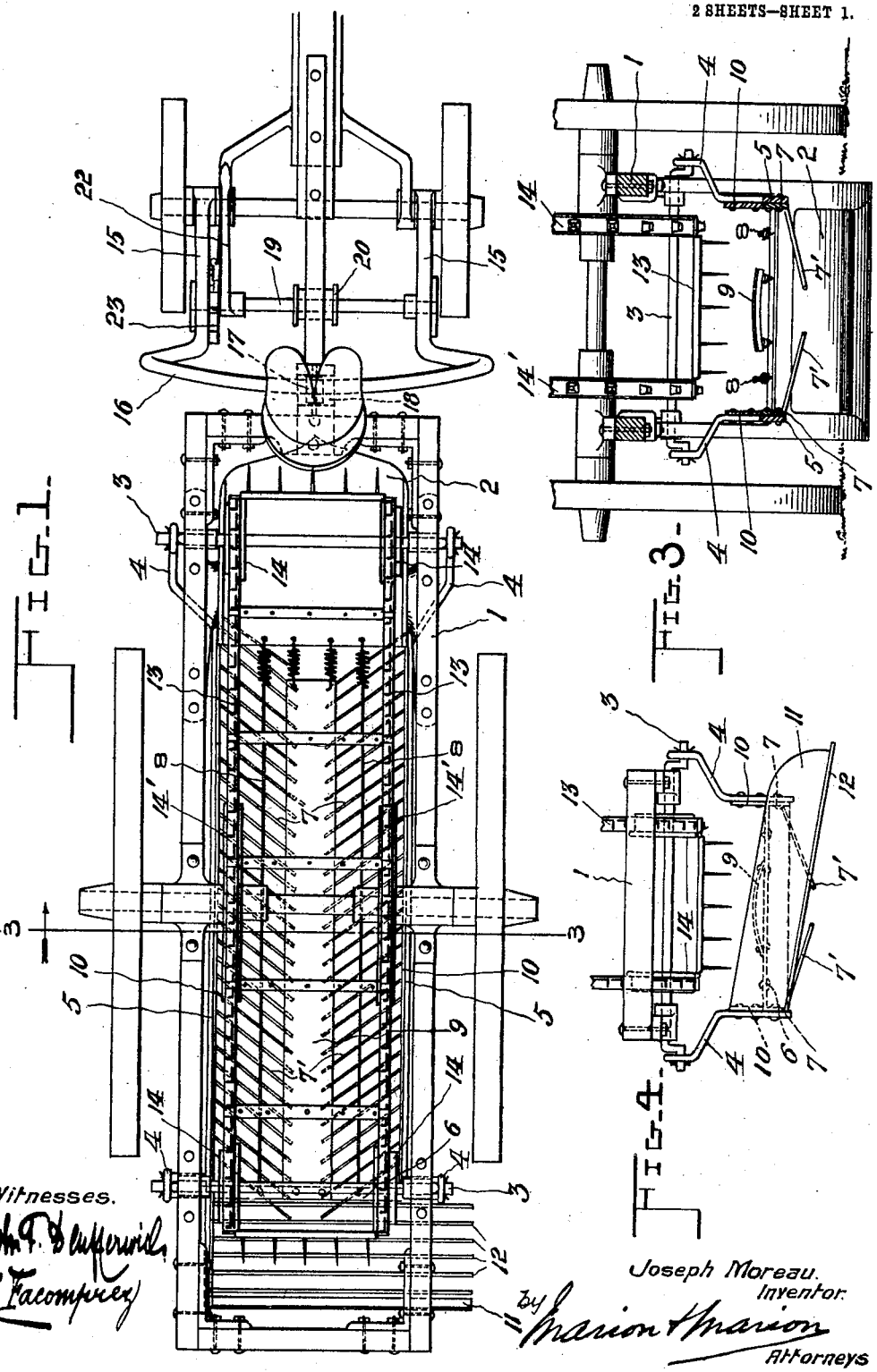

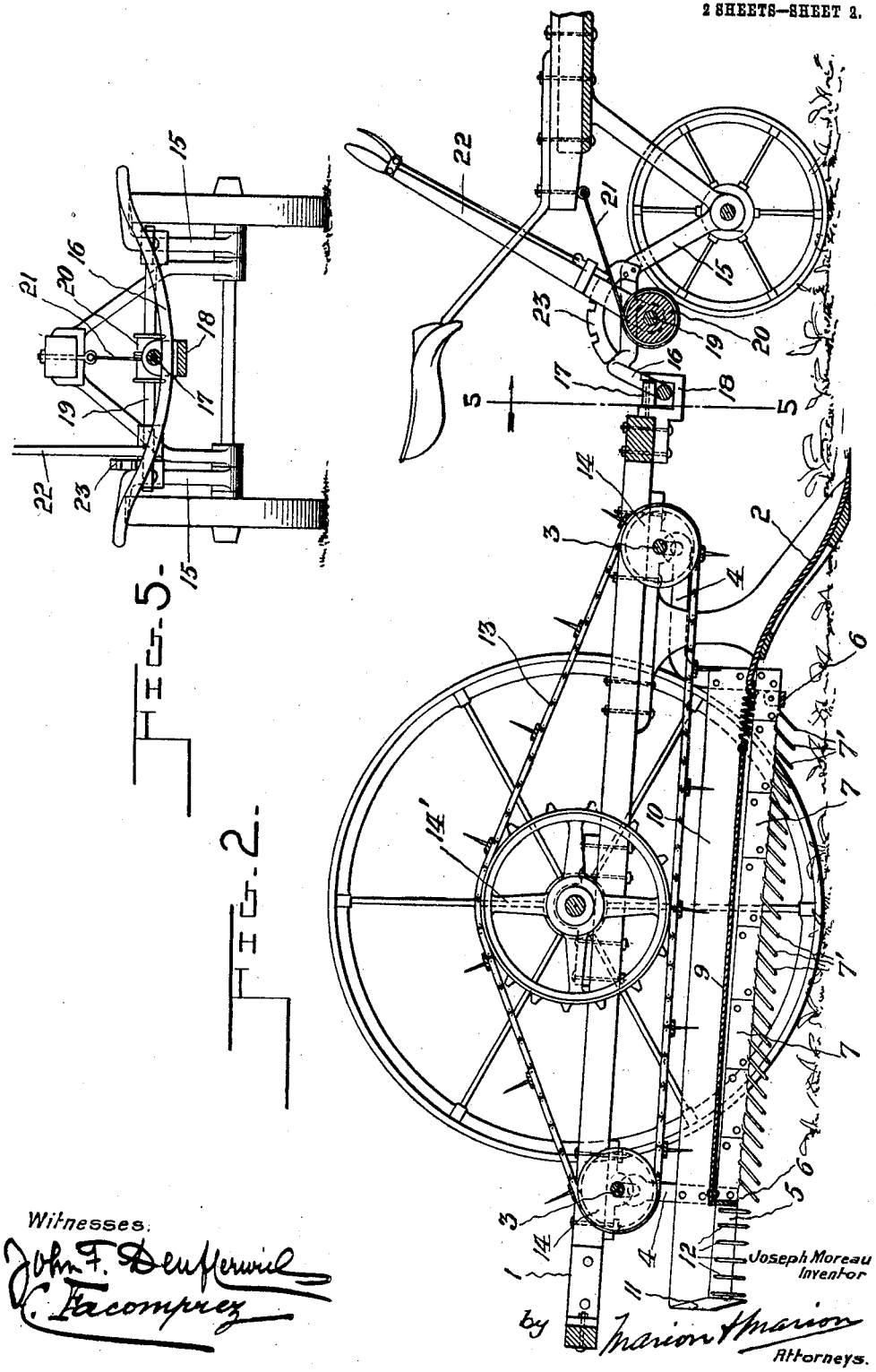

JOSEPH MOREAU, OF ST. GERMAIN DE GRANTHAM, QUEBEC, CANADA.

POTATO-DIGGER.

No. 925,124.     Specification of Letters Patent.     Patented June 15, 1909.

Application filed June 3, 1908. Serial No. 437,319.

*To all whom it may concern:*

Be it known that I, JOSEPH MOREAU, a subject of the King of Great Britain, residing at St. Germain de Grantham, county of Drummond, in the Province of Quebec, Canada, have invented certain new and useful Improvements in Potato-Diggers; and I do hereby declare that the following is a full, clear, and exact description of the invention, such as will enable others skilled in the art to which it appertains to make and use the same.

The invention to be hereinafter described relates to potato diggers and similar vegetable harvesting machines, and particularly to the separator mechanism of such machines, whereby the roots are freed from the earth with which they are dug.

Broadly speaking, the invention comprises a suitable wheeled frame, a plow secured to the frame, a shaker frame suspended from the frame, means for deflecting the earth to the sides of the center of the shaker frame, means for delivering the potatoes through the center of the shaker frame, a chute for delivering the potato vines and similar debris to one side of the machine, means for shaking the shaker frame, and a conveyer for moving the vines, &c., toward the chute.
In order to more clearly disclose the construction, operation and use of the machine, reference should be had to the accompanying drawings forming part of the present application.
Throughout the several views, in the drawings, like reference characters designate the same parts.

In the drawings: Figure 1 is a plan view of the machine; Fig. 2 is a central longitudinal section of the machine; Fig. 3 is a view of the machine on line 3—3 of Fig. 1, looking forward; Fig. 4 is a rear view of the machine; and, Fig. 5 is a section on line 5—5 of Fig. 2, looking in the direction of the arrow.
A solid substantial frame 1 of any desired construction, and, preferably, of rectangular form, is provided with journal bearings or sleeves through which passes the freely revoluble axle of the supporting wheels of the machine. To the fore part of this frame is solidly secured a depending scoop-shaped plow 2, by which the potatoes are dug. Transversely of the frame are journaled two or more crank shafts 3. From the cranks of these shafts are suspended the arms 4 of a shaker frame, which comprises side or longitudinal members 5 and cross members 6, the side and cross members being solidly bolted or otherwise secured together. To the longitudinal members are removably secured, by bolts or otherwise, a plurality of plates or sections 7, each provided with a plurality of rearwardly and downwardly inclined tines 7'. Thus, on reference to Fig. 3, it will be seen that the two rows of tines extend toward each other, leaving a narrow opening running lengthwise of the shaker frame, between them. Above these tines, and extending the full length of the shaker frame, are a plurality of spring wires 8, connected at their opposite ends, respectively, to the rear of the plow 2 and to the rear cross member 6 of the shaker frame.

Overlying the longitudinal opening between the tines 7 and spaced slightly above the same, is a deflector plate 9, having one end rigidly connected to the rear cross beam 6 of the shaker frame, and its opposite end connected by spiral springs to the rear edge of the plow 2. The upper face of this plate should be slightly convex or peaked, in order to deflect the earth and potatoes toward its opposite edges.

Of course, as the potatoes, earth, vines, &c., are forced up over the plow 2 and onto the wires 8 and plate 9, there will be a tendency for them to fall from the outer edges to the ground. To prevent this, upright guard boards 10, plates, or the like, have been provided. These are rigidly secured to the longitudinal members of the shaker frame, and extend for the full length thereof, forming a wall sufficiently high to insure retention of all potatoes, earth, &c., passing rearwardly from the plow. The rear end of the shaker frame is provided with a rigid tail board 11, and a plurality of long slanting tines 12, which extend from one side of the machine clear across to the opposite side, the tail board and tines constituting a chute down which the potato vines slide. Thus, the vines and similar debris will be delivered at one side of the machine and to the rear.

In order to move the vines and similar debris rearwardly and thus prevent clogging of the machine, a conveyer 13 is provided. This conveyer serves two purposes: It moves the vines toward the chute, and also acts as a drive chain or belt for the wheels 14, by which the crank shafts 3 are driven. In order to drive the conveyer, large sprocket wheels 14' are fixed to the main axle of the machine.

It is very desirable to have the plow automatically raised as the machine is turned at the end of each row. To that end, a wheeled forward guide or sulky frame is provided. About the axle of this frame is revolubly journaled a yoke 15, provided with a downwardly curved rear bar or rod 16, over which travels a roller 17 mounted in a bracket 18 secured to the forward end of the frame 1.

In order to adjust the plow to the proper depth, a drum and rope connection are used between the yoke 15 and the sulky frame. This comprises a freely revoluble rod 19, journaled in the arms of the yoke 15, a drum 20 fixed to the rod, a hoisting rope or cable 21 secured at its opposite ends to the drum and sulky frame, a hand lever 22 fixed to the rod 19, and a rack or arc plate 23 fixed to one of the arms of the yoke and adapted to coöperate with the catch of the hand lever to lock the plow in adjusted position.

The operation of the machine is as follows: The lever 22 is swung either forward or backward to wind up or let out the rope or cable 21 until the plow 2 has been adjusted to the desired depth. The catch of the lever is then allowed to enter a notch in the arc plate 23, and the plow is locked in adjusted position. The machine is now moved forward, forcing the potatoes, earth, &c., upward over the plow 2 onto the wires 8 and plate 9. At the same time, the forward movement of the machine drives the conveyer 13, and through it revolves the crank shafts 3, which in turn impart a reciprocating shaking motion to the shaker frame. Such motion forces the potatoes and earth from the center of the plate 9 toward its edges, and through between the wires 8, to either side of the opening left between the tines 7'. However, as the potatoes fall onto the tines 7', they will slide downward and enter these tines toward the opening at the center, being finally delivered in a long row, from such center opening. The earth, which has been deflected by the plate 9, will pass through between the tines 7', and fall at either side of the row. The vines and similar debris will, of course, be carried along toward the rear of the machine by the conveyer 13, from which they will finally pass to the chute formed by the tail board 11 and tines 12. The chute, extending completely across the machine, will, of course, guide the vines out and completely away from or to one side of the machine. Thus, it will be evident that the potatoes will be delivered in a long row from the center of the machine completely free from earth and vines and all other debris, the earth being separated and deflected to either side of such row, and the vines and similar debris being deposited at a considerable distance to one side of the row.

As the machine completes a row and turns to take the next row in the opposite direction, the upward curve of the rod 16 will be forced beneath the roller 17, thus raising it and the forward end of the frame 1 to which it is connected. Of course, as the frame is raised, the plow 2 will be raised with it, thus allowing free turning movement of the machine. When the machine has been again turned into a straightforward direction, the roller 17 will be seated in the low part or hollow of the rod 16, thus allowing the plow 2 to drop to the position at which it was originally set.

It is clear that many changes may be made in the construction, arrangement and combination of the several parts of the machine, and that substitutions may be made, without in any way departing from the field and scope of the invention, and it is meant to include all such within this application, wherein only a preferred form has been shown and described.

Having thus fully described my invention, what I claim as new, and desire to secure by Letters Patent, is:—

1. A potato digger of the character described, comprising a frame, a plow secured thereto, a shaker frame suspended from said frame in the rear of said plow and adapted to receive potatoes therefrom, a horizontally disposed deflecting plate in said shaker frame, extending longitudinally thereof and adapted to deflect the potatoes laterally from its upper surface, and means for shaking said shaker frame.

2. A potato digger of the character described comprising a frame, a plow secured thereto, a shaker frame suspended from said frame in the rear of said plow, a plurality of tines secured to said shaker frame and projecting inwardly toward the center thereof, a deflecting plate secured to said shaker frame above said tines, and means for shaking said shaker frame.

3. A potato digger of the character described comprising a frame, a plow secured thereto, a shaker frame suspended from said frame and in the rear of said plow, separating wires secured to said shaker frame, a plurality of tines secured to said shaker frame below said separating wires and directed inwardly toward the center of said frame, a deflecting plate secured to said shaker frame above said tines, and means for shaking said shaker frame.

4. A potato digger of the character described comprising a frame, a plow secured thereto, a shaker frame suspended from the frame and provided with a longitudinal opening adapted to allow the passage of potatoes, a deflecting plate mounted in said shaker frame and extending longitudinally of the same, and overlying the opening therein, and means for shaking the shaker frame.

5. A potato digger of the character described comprising a frame, a plow secured thereto, a shaker frame suspended from said frame in the rear of said plow and adapted to receive potatoes therefrom, a deflecting plate extending longitudinally thereof, spring connections between said deflecting plate and said plow, and means for shaking said shaker frame.

6. A potato digger of the character described comprising a frame, a plow secured thereto, a shaker frame suspended from said frame in the rear of said plow and adapted to receive potatoes therefrom, a convex deflecting plate in said shaker frame and extending longitudinally thereof, and means for shaking said shaker frame.

In witness whereof I have hereunto set my hand in the presence of two witnesses.

JOSEPH MOREAU.

Witnesses:
EUGENE M. SLINEY,
W. S. BABCOCK.